(12) United States Patent
Ueda et al.

(10) Patent No.: US 9,456,624 B2
(45) Date of Patent: Oct. 4, 2016

(54) METHOD FOR COOKING FOODS, AND HEATING COOKER

(71) Applicant: SHARP KABUSHIKI KAISHA, Osaka-shi, Osaka (JP)

(72) Inventors: Shinya Ueda, Osaka (JP); Tatsuya Mineoka, Osaka (JP); Yasuaki Sakane, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/379,551

(22) PCT Filed: Feb. 27, 2013

(86) PCT No.: PCT/JP2013/055222
§ 371 (c)(1),
(2) Date: Aug. 19, 2014

(87) PCT Pub. No.: WO2013/129516
PCT Pub. Date: Sep. 6, 2013

(65) Prior Publication Data
US 2015/0030730 A1    Jan. 29, 2015

(30) Foreign Application Priority Data
Mar. 2, 2012    (JP) .................................. 2012-046526

(51) Int. Cl.
*A47J 27/00*    (2006.01)
*H05B 6/64*    (2006.01)
*A23L 1/025*    (2006.01)
(Continued)

(52) U.S. Cl.
CPC .............. *A23L 1/025* (2013.01); *A23L 1/0121* (2013.01); *A23L 1/0128* (2013.01); *A23L 1/302* (2013.01); *A47J 27/04* (2013.01); *F24C 7/08* (2013.01); *F24C 15/003* (2013.01);*F24C 15/327* (2013.01); *H05B 6/6479* (2013.01); *A47J 2027/043* (2013.01)

(58) Field of Classification Search
CPC .... F24C 7/088; F24C 15/003; F24C 15/327; H05B 6/6479; H05B 6/6473; A47J 27/62
USPC .......... 99/451, 476, 473, 467; 219/682, 681, 219/401, 400
See application file for complete search history.

(56) References Cited

U.S. PATENT DOCUMENTS

| | | | |
|---|---|---|---|
| 4,208,438 A * | 6/1980 | Saurenman ............ | A23B 4/056 426/235 |
| 7,776,373 B2 * | 8/2010 | Pelletier ................. | A22C 9/002 426/237 |
| 2013/0092034 A1 * | 4/2013 | Reinhard-Herrscher | A47L 15/4236 99/483 |

FOREIGN PATENT DOCUMENTS

| JP | 2004-242593 A | 9/2004 |
|---|---|---|
| JP | 2008-111647 A | 5/2008 |

(Continued)

OTHER PUBLICATIONS

Tamaki et al., "Effect of Air on Supply on Quality of Lettuce during Storage", Environment Control Biology, vol. 46, No. 1, pp. 57-60, 2008.

*Primary Examiner* — Reginald L Alexander
(74) *Attorney, Agent, or Firm* — Birch, Stewart, Kolasch & Birch, LLP

(57) ABSTRACT

PCI (Plasmacluster Ion) ions are released for approximately five minutes to a food such as vegetables, at a temperature of around 40° C. in a no-air flowing state and with no steam present.

2 Claims, 7 Drawing Sheets

(51) Int. Cl.

| | |
|---|---|
| *F24C 15/00* | (2006.01) |
| *F24C 7/08* | (2006.01) |
| *F24C 15/32* | (2006.01) |
| *A23L 1/01* | (2006.01) |
| *A47J 27/04* | (2006.01) |
| *A23L 1/302* | (2006.01) |

(56) References Cited

FOREIGN PATENT DOCUMENTS

| | | | |
|---|---|---|---|
| JP | 2008-161153 A | 7/2008 | |
| JP | 2009-14237 | * 1/2009 | ............ F24C 15/327 |

* cited by examiner

VC QUANTITY RATIO AT VARIOUS PROCESSING TIMES ON RAW BASIS
(PCI 5 M, TEMP. 40°C, NO STEAM)

VC COMPARISON OF CORN MARIGOLD
(40°C, 5 MIN. PROCESSING, PCI 5 M, NO STEAM)

METHOD FOR COOKING FOODS, AND HEATING COOKER

TECHNICAL FIELD

The present invention relates to a method for cooking foods, for example, a method for cooking vegetables and fruits. The invention also relates to a heating cooker.

BACKGROUND ART

Conventionally, there has been a vegetable cooking method described in JP 2008-111647 A (PTL1). In this vegetable cooking method, a vegetable such as spinach is exposed to a steam temperature atmosphere controlled to a specified steam temperature so that vitamin C remains in the vegetable in as large an amount as possible.

In the case where the food is spinach, insufficient heating would cause the lye to be too strong, making the spinach uneatable. On the other hand, vitamin C decreases due to heating, so that sufficient heating of the food would cause the quantity of vitamin C to decrease.

CITATION LIST

Patent Literature

PTL1: JP 2008-111647 A

SUMMARY OF INVENTION

Technical Problem

Accordingly, an object of the invention is to provide a method for cooking foods and a heating cooker which are capable of remarkably increasing vitamin C of cooked foods.

Solution to Problem

It is therefore an object of the present invention to provide a method for cooking a food, wherein ion species that contribute to increases vitamin C of the food are released to the food under a temperature condition that allows vitamin C of the food to be increased.

In addition, the term 'food' includes food generally called as leafy vegetables such as spinach, corn marigold, lettuce and cabbage.

The present inventor found that in cooking a food such as vegetables, releasing proper ion species to the food at a proper temperature region makes it possible to remarkably increase the vitamin C quantity as compared with its initial quantity. The inventor also found that such treatment as described above applied to the food, even with a steam cooking or the like subsequently performed, makes it possible to suppress decreases in vitamin C to a minimum so that a heated cooked food containing more vitamin C quantity can be eaten.

According to this invention, since ion species that contribute to increases in vitamin C of the food are released to the food under a temperature condition that allows vitamin C of the food to be increased, it becomes possible to eat the cooked food containing larger quantities of vitamin C.

In one embodiment, the temperature condition is keeping of a temperature within a range of 25° C. to 45° C.

The inventor experimentally verified that releasing proper ions to the food such as vegetables under a temperature condition of 25° C. to 45° C. makes it possible to increase the vitamin C of the cooked food.

According to this embodiment, since the temperature in releasing proper ions to the food is within a range of 25° C. to 45° C., it becomes possible to increase the vitamin C contained in the cooked food.

In one embodiment, the temperature condition is keeping of a temperature within a range of 30° C. to 43° C.

The inventor verified that releasing proper ions to the food such as vegetables under a temperature condition of 40° C. makes it possible to increase the vitamin C of the cooked food to a maximum. The inventor also verified that releasing proper ions to the food under a temperature condition of 30° C. to 43° C. makes it possible to efficiently increase the vitamin C of the cooked food.

According to this embodiment, since the temperature in releasing proper ions to the food is within a range of 30° C. to 43° C., it becomes possible to efficiently increase the vitamin C contained in the cooked food.

In one embodiment, the ion species contain negative ions.

According to experiments, vitamin C quantity of the food increased by releasing negative ions more than by releasing positive ions.

According to this embodiment, since the ion species contain negative ions, it is possible to increase vitamin C of the food.

In one embodiment, the ion species contain $H^+ (H_2)_m$ (where m is an arbitrary natural number) and $O_2^- (H_2O)_n$ (where n is an arbitrary natural number).

The inventor found that as ions composed of so-called PCI (Plasmacluster Ion) (Registered Trademark No. 4687401) ions, which are ions composed of $H^+ (H_2O)_m$ (where m is an arbitrary natural number) and $O_2^- (H_2O)_n$ (where n is an arbitrary natural number), are released to the food at a proper temperature, the quantity of vitamin C can be greatly increased, as compared with its initial level.

According to this embodiment, since the ion species contain PCI ions including $H^+ (H_2O)_m$ (where m is an arbitrary natural number) and $O_2^- (H_2O)_n$ (where n is an arbitrary natural number), vitamin C of the food can be greatly increased.

In one embodiment, the ion species are released to the food in a no-air flowing state.

The inventor verified that releasing ion species to the food in a no-air flowing state makes it possible to increase vitamin C of the food more than when ion species are released to the food in an air-flowing state.

According to this embodiment, since ion species are released to the food in a no-air flowing state, vitamin C of the food can be increased efficiently.

It is also an object of the present invention to provide a heating cooker comprising:

a heating cabinet;

heating means for heating a food in the heating cabinet;

selection means for selecting a cooking menu of a food in which the food is cooked at a temperature that allows vitamin C of the food to be increased;

ion species releasing means for releasing ion species that allow vitamin C to be increased in the foodset in the heating cabinet; and control mean for controlling an inside temperature of the heating cabinet to the vitamin C-increasing temperature by the heating means, and also for driving the ion species releasing means, in a case when the selection means selects the cooking menu.

According to this invention, the heating cooker includes the control means for controlling the temperature to a vitamin C-increasing temperature by the heating means and for driving the ion species releasing means. Therefore, it is possible to increase vitamin C of the food.

In one embodiment, the heating means comprises:
steam heating means for heating with steam; and
non-steam heating means for heating without steam, wherein
in a case of a cooking for making an increase of a vitamin C, the control means does not drive the steam heating means but does drive the non-steam heating means.

The inventor verified that the lower the steam concentration is, the larger the increase in vitamin C becomes.

According to this embodiment, since the non-steam heating means is driven and the steam heating means is not driven in the cooking the food, the quantity of vitamin C can be greatly increased, as compared with conventional counterparts in which heating is done in a steam atmosphere.

Advantageous Effects of Invention

According to the cooking method for foods in this invention, vitamin C of the cooked food can be increased efficiently.

Also according to the heating cooker in this invention, a cooking that allows vitamin C of the cooked food to be efficiently increased can be fulfilled.

DESCRIPTION OF EMBODIMENTS

Hereinbelow, the present invention will be described in detail by embodiments thereof illustrated in the accompanying drawings.

Figure 1:
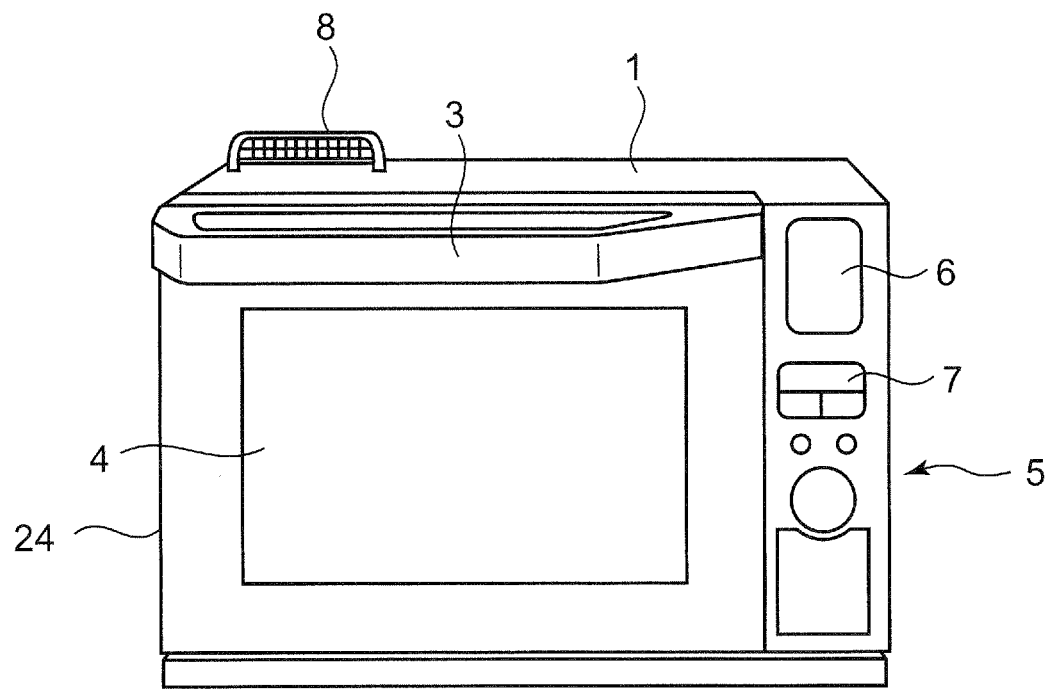
FIG. 1 is a front view of a steam cooker which is an embodiment of the heating cooker according to the invention.

FIG. 1 is a front view of a steam cooker which is an embodiment of a heating cooker according to the invention.

As shown in FIG. 1, the steam cooker includes a casing 1, a door 24, a handle 3, a heat-resistant glass 4, an operation panel 5, and an exhaust duct 8.

The door 24 is attached at a front of the casing 1 so as to be pivotable generally about a lower-end side line thereof. The handle 3 is attached at an upper portion of the door 24, and the heat-resistant glass 4 is attached at a generally center of the door 24. The operation panel 5 is provided on the right side of the door 24. The operation panel 5 has a color LCD (Liquid Crystal Display) part 6 and a button group 7 as a selection means, where information is to be displayed on the color LCD part 6. The exhaust duct 8 is provided at an upper left-side rear of the casing 1. The exhaust duct 8 is provided to exhaust air, which has come up via a heating cabinet, to outside. A user is enabled to select a menu of vitamin C-increased cooking by operating the button group 7.

Figure 2:
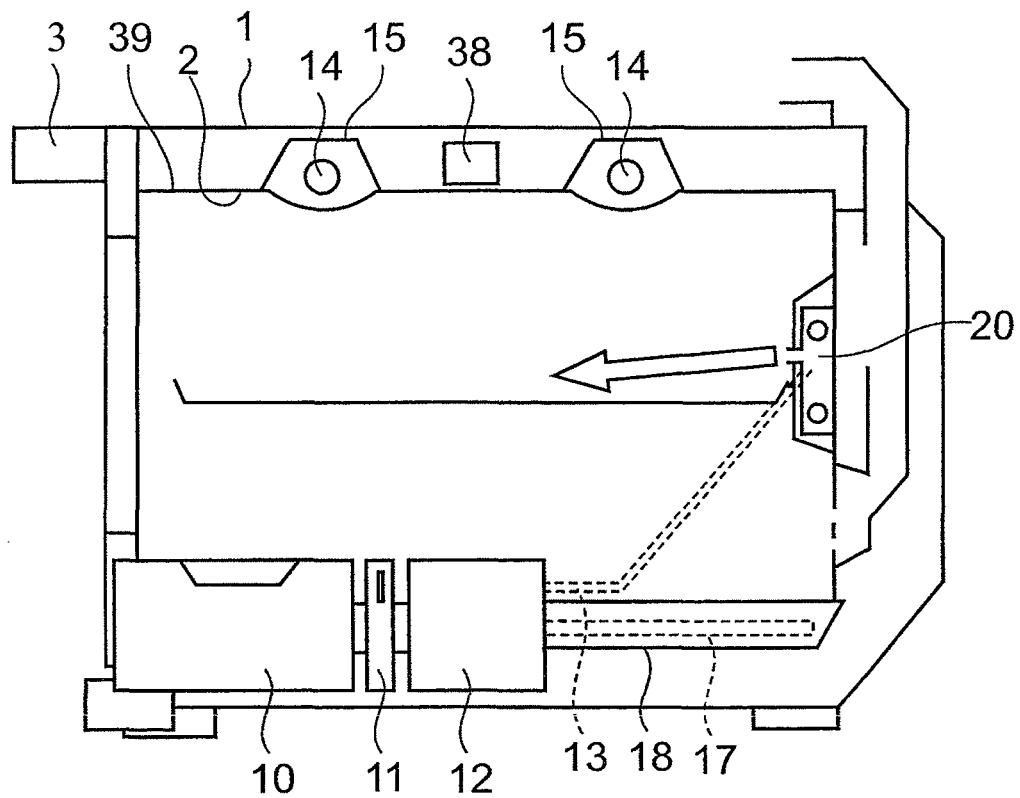
FIG. 2 is a schematic view of a longitudinal cross section of the steam cooker.

FIG. 2 is a schematic view of a longitudinal cross section of the steam cooker.

As shown in FIG. 2, the steam cooker includes a water level sensor 11, a feedwater pump 12, a water supply pipe 13, upper heaters 14, upper heater covers 15, a lower heater 17, a heat shielding plate 18, a steam generator 20, and an ion generator 38 as an ion species releasing means.

The feedwater pump 12 sucks water from within a feedwater tank 10 and feeds the sucked water via the water supply pipe 13 to the steam generator 20. The steam generator 20 also acts to heat water derived from the feedwater pump 12 so as to generate steam, or feed generated steam into the heating cabinet 2, or superheat the steam so as to make superheated steam and feed the superheated steam into the heating cabinet 2. It is noted that the term 'superheated steam' refers to steam heated up to a superheated state of 100° C. or higher.

This steam cooker is capable of heating foods with steam or superheated steam derived from the steam generator 20 and furthermore capable of heating foods with radiant heat from the upper heaters 14 and the lower heater 17. A ceiling wall of the heating cabinet 2 is provided under the upper heaters 14, while a bottom wall of the heating cabinet 2 is provided on the lower heater 17. The upper heaters 14 and the lower heater 17 are structurally kept from being exposed into the heating cabinet 2. In this steam cooker, steam from the steam generator 20 is blown into the heating cabinet 2 through blowoff holes provided on an upper side in the heating cabinet 2.

The ion generator 38 is placed between the casing 1 and a top plate 39 of the heating cabinet 2. The ion generator 38 is positioned at a generally center of an outer surface of the top plate of the heating cabinet 2. The ion generator 38 generates PCI ions (ions in which $H^+ (H_2O)_m$ (where m is an arbitrary natural number) and $O_2^- (H_2O)_n$ (where n is an arbitrary natural number) are mixed together) through plasma discharge by the method described in JP 3680121 A, and releases the PCI ions naturally downward into the heating cabinet 2 so that the PCI ions are diffused in the heating cabinet 2.

The steam cooker also has an unshown magnetron, which generates microwaves in the body casing 1. The magnetron is placed in lower part of the heating cabinet 2. Microwaves generated by the magnetron are led to a lower center of the heating cabinet 2 by a waveguide (not shown). Microwaves led to the lower center of the heating cabinet 2 by the waveguide, while being stirred by a rotating antenna driven by an unshown motor, are radiated upward in the heating cabinet 2 so as to heat foods.

The upper heaters 14, the lower heater 17, the magnetron and the steam generator 20 constitute a heating means. Also, the upper heaters 14, the lower heater 17 and the magnetron constitute a non-steam heating means, and the non-steam heating means is driven when any one of those members, or any two of those members, or all of those members are driven. Furthermore, the upper heaters 14, the lower heater 17 and the steam generator 20 constitute a steam heating means, and the steam heating means is driven when any two including the steam generator 20 or all of those members are driven.

Figure 3:
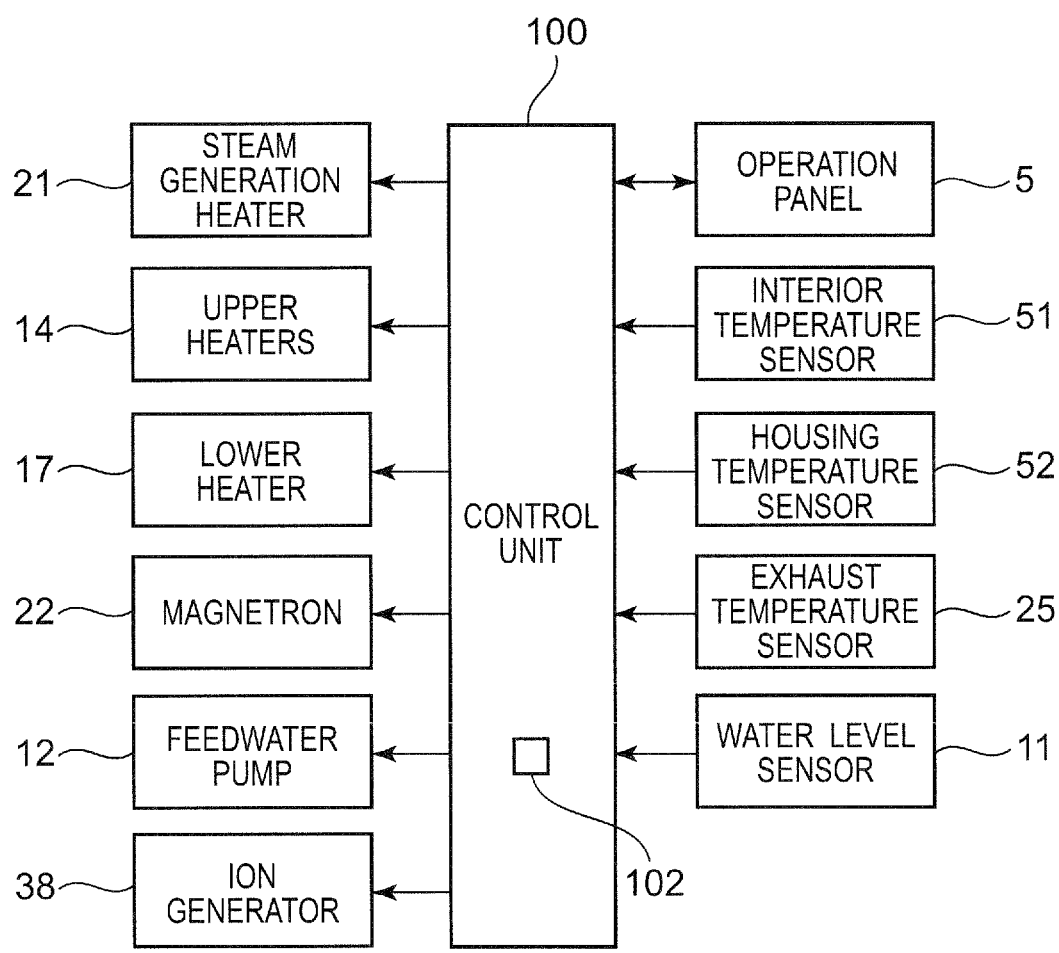
FIG. 3 is a control block diagram of the steam cooker.

FIG. 3 is a control block diagram of the steam cooker.

The steam cooker includes a control unit 100 as a control means in lower part of the casing 1. The control unit 100 has a control section implemented by a CPU (Central Processing Unit) formed of a microcomputer, memory for storing programs and data therein, and I/F (Interface) for implementing input/output of data to and from individual parts. The control unit 100 has electrical components, which are composed of a drive circuit for driving individual parts of the steam cooker, a control circuit for controlling the drive circuit, and the like.

As shown in FIG. 3, the control unit 100 receives signal inputs from an interior temperature sensor 51, a housing temperature sensor 52, an exhaust temperature sensor 25, and the water level sensor 11. Also, the control unit 100 delivers signal outputs to a steam generation heater 21, the upper heaters 14, the lower heater 17, a magnetron 22, the feedwater pump 12, and the ion generator 38. Furthermore, the control unit 100 performs bidirectional signal exchange with the operation panel 5. In addition, the interior temperature sensor 51 detects an atmosphere temperature in the heating cabinet 2, the housing temperature sensor 52 detects a housing temperature of the steam generator 20, and the exhaust temperature sensor 25 detects an exhaust temperature. These temperature sensors 51, 52, 25 delivers signals representative of detected temperatures to the control unit 100. As shown in FIG. 3, the control unit 100 contains a timer 102, being enabled to fulfill time measurement.

Figure 4:
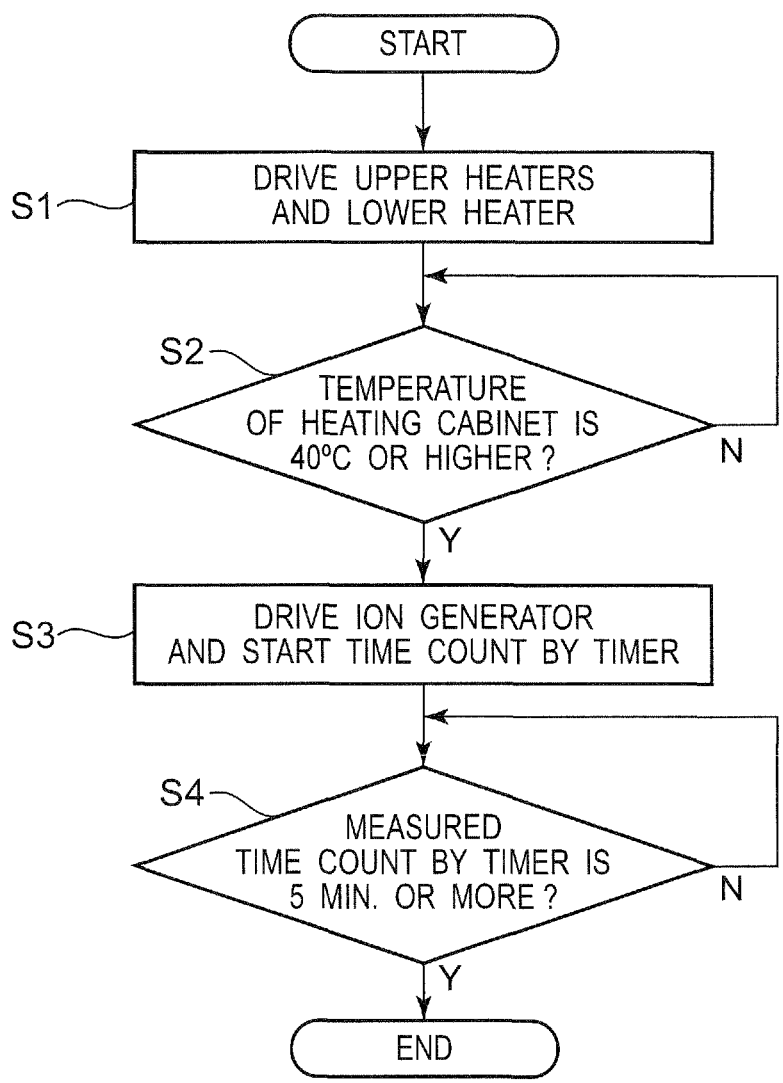
FIG. 4 is a flowchart showing control steps to be executed in the steam cooker upon selection of a menu of vitamin C-increased vegetable cooking.

FIG. 4 is a flowchart showing control steps to be executed in the steam cooker when a menu of vitamin C-increased cooking is selected by the button group 7.

Upon start of the vitamin C-increased cooking, first at step S1, the control unit 100 drives the upper heaters 14 and the lower heater 17. Subsequently at step S2, based on a signal from the interior temperature sensor 51, the control unit 100 decides whether or not the temperature of the heating cabinet 2 is equal to or higher than 40° C.

If the control unit 100 has decided at step S2 that the temperature of the heating cabinet 2 is 40° C. or higher, then the processing flow moves to step S3. On the other hand, if the control unit 100 has decided at step S2 that the temperature of the heating cabinet 2 is lower than 40° C., then the step S2 is repeated once more.

Next, at step S3, the control unit 100 drives the ion generator 38 to release PCI ions to vegetables or other foods while starting time count by the timer 102. In the course of step S3, the control unit 100 performs, for example, on/off control of the upper heaters 14 and the lower heater 17 to maintain the temperature of the heating cabinet 2 at around 40° C.

Subsequently at step S4, the control unit 100 decides whether or not the time count by the timer 102 is equal to or more than 5 min. If it is decided at step S4 that the time count by the timer is shorter than 5 min., the step S4 is redone once more. On the other hand, if it is decided at step S4 that the time count by the timer is 5 min. or more, the control unit 100 stops the drive of the ion generator 38 while stopping the drive of the upper heaters 14 and the lower heater 17, where the control process is ended.

The inventor performed a plurality of tests relating to increases in vitamin C of vegetables due to radiation of ions under the following conditions. In this case, detection of vitamin C was performed as follows.

That is, with a vegetable processing quantity set to 50 g, the processed vegetable was suspended (mixer) for 2 minutes with a 5% metaphosphoric acid solution. In this case, metaphosphoric acid having a mass of vegetable weight×1.2 was used for a case of spinach as the vegetable, while metaphosphoric acid having a mass of vegetable weight×1 was used for another case of corn marigold as the vegetable. Subsequently, the suspended vegetable was filtrated by filter paper, and the filtrate was put into a micro-tube in steps of 1.5 cc. Then, after a one-minute centrifugal separation process was executed, an ascorbic-acid Reflectoquant test strip for the reflective photometer RQflex (registered trademark) was dipped to a supernatant of the centrifugally separated filtrate (for 2 seconds), followed by measurement of vitamin C (3 times or more). Finally, measured values obtained by the measurement were multiplied by a dilution ratio and converted to mg/100 g equivalence, by which vitamin C quantities were calculated. This operation process was executed at least three times under the same conditions, and their average value was used to specifically determine a vitamin C quantity.

Figure 5:
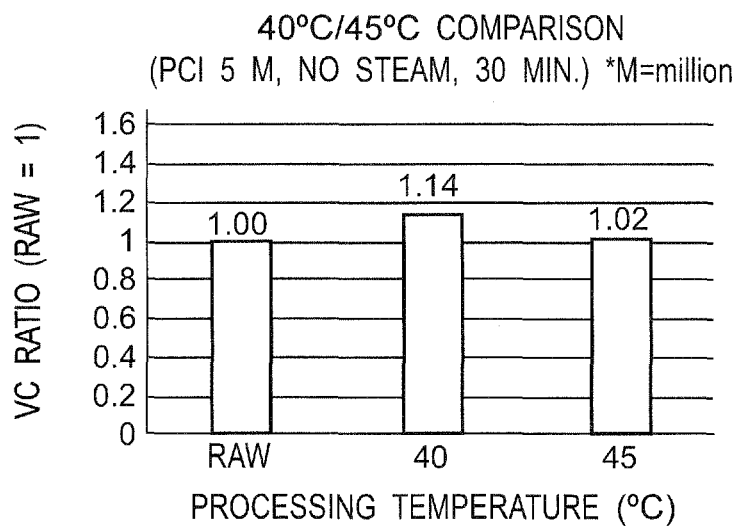
FIG. 5 is a chart showing a difference in vitamin-C detection quantity between processing temperatures of 40° C. and 45° C.

FIG. 5 is a chart showing a difference in vitamin-C detection quantity between processing temperatures of 40° C. and 45° C. The processing was done, for both temperatures, under the condition that PCI ions as ion species were released to the spinach at a rate of 5 million pcs/cm$^3$ for 30 minutes with no steam present. Also, vitamin C quantities were expressed in the horizontal axis of FIG. 5 by ratios with the vitamin C quantity of non-processed raw spinach assumed as 1.

As shown in FIG. 5, with the processing temperature of 40° C., the vitamin C ratio is 1.14, showing a large increase from 1. On the other hand, with the processing temperature of 45° C., the vitamin C ratio is 1.02, being generally equal to or slightly larger than the raw spinach value of 1. Thus, the vitamin C quantity can be greatly increased with the processing temperature of 40° C.

Figure 6:
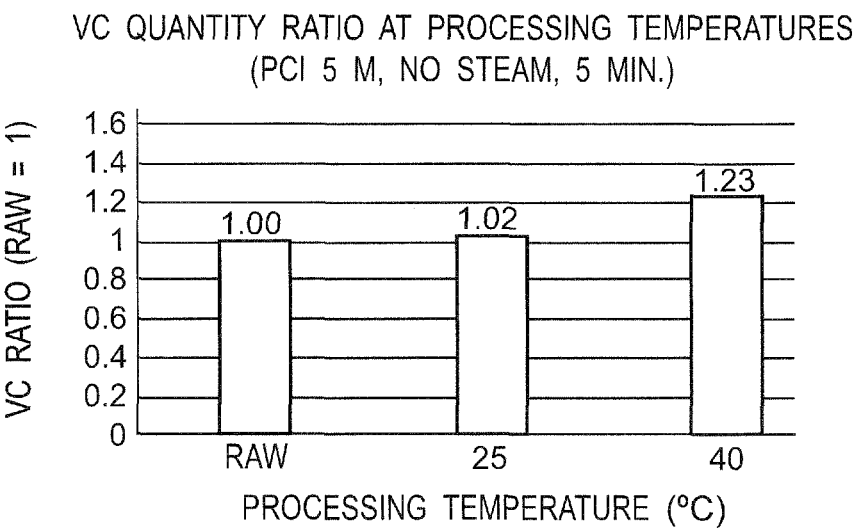
FIG. 6 is a chart showing a difference in vitamin-C detection quantity between processing temperatures of 25° C. and 40° C.

FIG. 6 is a chart showing a difference in vitamin-C detection quantity between processing temperatures of 25° C. and 40° C. The processing was done, for both temperatures, under the condition that PCI ions as ion species were released to the spinach at a rate of 5 million pcs/cm$^3$ for 5 minutes with no steam present. Also, vitamin C quantities were expressed in the horizontal axis of FIG. 6 by ratios with the vitamin C quantity of non-processed raw spinach assumed as 1.

As shown in FIG. 6, with the processing temperature of 25° C., the vitamin C ratio is nearly equal to or slightly higher than 1. On the other hand, with the processing temperature of 40° C., the vitamin C ratio is 1.23, being greatly larger than the raw spinach value of 1. Thus, the processing effect can be obtained with the processing temperature of 25° C., and the vitamin C quantity can be greatly increased with the processing temperature of 40° C.

Figure 7:
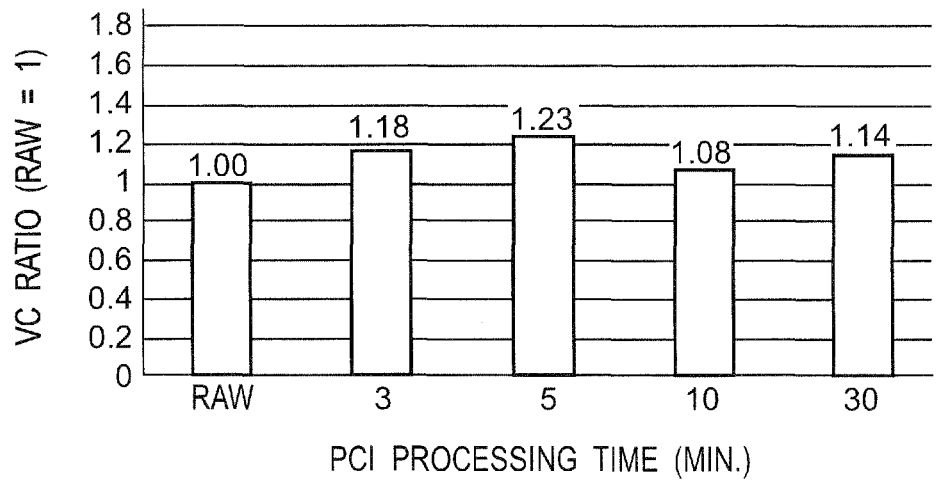
FIG. 7 is a chart showing differences in vitamin-C detection quantity among individual processing time durations.

FIG. 7 is a chart showing differences in vitamin-C detection quantity among individual processing time durations. The processing was done at a temperature of 40° C. with no steam present by releasing PCI ions as ion species to the spinach at a rate of 5 million pcs/cm$^3$. Also, vitamin C quantities were expressed in the horizontal axis of FIG. 7 by ratios with the vitamin C quantity of non-processed raw spinach assumed as 1.

As shown in FIG. 7, as the processing time duration increases, the vitamin C quantity increases so as to be maximum at a processing time duration of 5 minutes. On the other hand, with the processing time duration over 5 minutes, the vitamin C quantity decreases to levels of vitamin C contained in the raw vegetable. Thus, setting the processing time duration to a value around 5 minutes, e.g. within a range of 3 to 7 minutes, allows the vitamin C quantity to be efficiently increased. In addition, whereas the value of 1.08 at 10 minutes increased to 1.14 at 30 minutes in FIG. 7, this increase can be considered as a variation within a margin of error.

Figure 8:
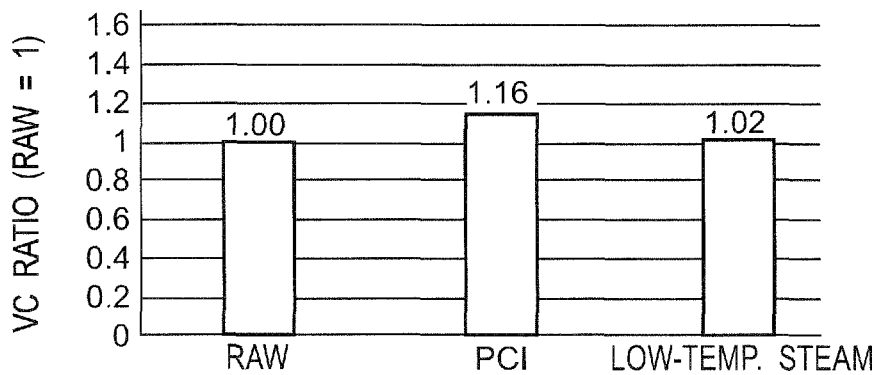
FIG. 8 is a chart showing a comparison in vitamin-C detection quantity between a case where the processing according to the invention was executed and another case where the low-temperature steam processing of PTL1 was executed.

FIG. 8 is a chart showing a comparison in vitamin-C detection quantity between a case where the processing according to the invention was executed and another case where the low-temperature steam processing of PTL1 was executed. In both cases of processing, the space volume where the processing was done was 26 L, the temperature was 40° C., and the processing time duration was 5 minutes. The processed vegetable was corn marigold, and the invention processing was done with no steam present and with PCI used as the ion species while the low-temperature steam method was performed under a steam pressure of 760 Torr. As shown in FIG. 8, it was verified that at a processing time of 5 minutes, vitamin C quantity increased from 1 to 1.16 in the method of the invention processing while vitamin-C increasing effects were little found at the processing time of 5 minutes in the method of low-temperature steam. Thus, using the processing method of the invention allows vitamin C quantity to be increased efficiently in shorter time, as compared with conventional cases.

Figure 9:
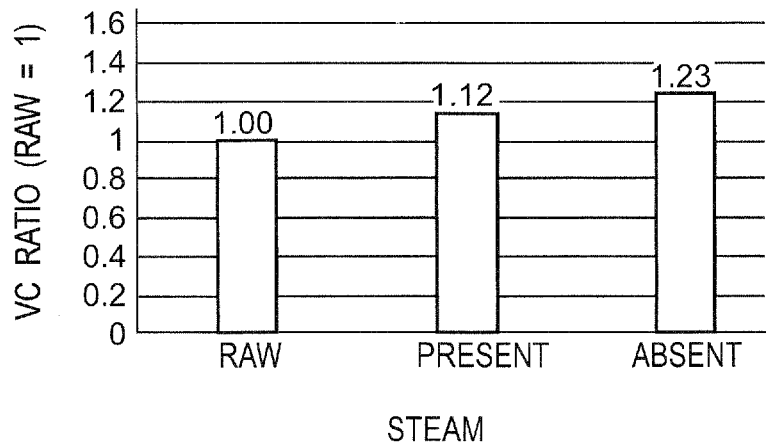
FIG. 9 is a chart showing a difference in vitamin-C detection quantity between a case where steam is present and another case where steam is absent.

FIG. 9 is a chart showing a difference in vitamin-C detection quantity between a case where steam is present and another case where steam is absent. In both cases, the processing was performed for 5 minutes with a temperature of 40° C. Also, the processing was done by releasing PCI ions to spinach at a rate of 5 million pcs/cm$^3$.

As shown in FIG. 9, the case with no steam present showed a remarkable increase in vitamin C quantity, as compared with the case with steam present. Thus, performing the invention processing with no steam present allows vitamin C quantity to be increased efficiently.

Figure 10:
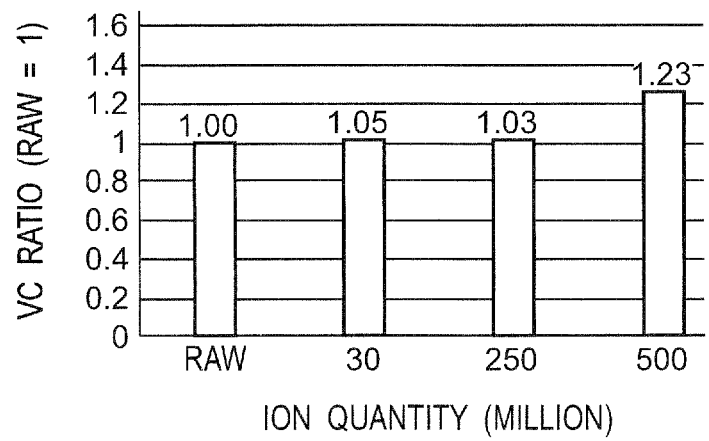
FIG. 10 is a chart showing differences in vitamin-C detection quantity among ion quantities applied to vegetable.

FIG. 10 is a chart showing differences in vitamin-C detection quantity among various ion quantities of irradiation. In each case, the processing was performed for 5 minutes at a temperature of 40° C. and with no steam present. Also, spinach was used as the vegetable to be irradiated with ions. The processing was done by using PCI ions.

As shown in FIG. 10, no remarkable increase in vitamin C quantity can be found until the quantity of PCI ions reaches 2.5 million pcs/cm$^3$ while vitamin C greatly increases as the quantity of PCI ions reaches 5 million pcs/cm$^3$. Thus, irradiating the vegetable with 5 million pcs/cm$^3$ or more of PCI ions allows vitamin C quantity to be increased efficiently.

The above-described tests are an example of the tests that the present inventor performed, and the inventor also performed tests in addition to those ones. In those additional tests, with PCI ions released to vegetables, it was possible to increase vitamin C of vegetables with the temperature set within a range of 25° C. to 45° C. Also it was possible to efficiently increase vitamin C with the temperature set within a range of 30° C. to 45° C. and moreover to increase vitamin C over that level with the temperature set over 35° C. Moreover, it was possible to further increase vitamin C with the temperature set within a range of 37° C. to 43° C.

As the temperature became higher than 45° C., the content of vitamin C lowered. As the temperature became over 50° C., the content of vitamin C became extremely lower. Further, with not only PCI ions but ions having OH radicals or negative ions such as $O_2^-$ ions released to vegetables, it was possible to increase vitamin C. Also, when ions were released to vegetables in a no-air flowing state, it was possible to efficiently increase vitamin C of the vegetables. Also, when PCI ions were sprinkled from the ceiling side of the heating cabinet to vegetables placed lower than the ceiling side in a no-air flowing state by natural dispersion using electric discharge, it was possible to efficiently increase the vitamin C.

According to this embodiment, PCI ions that contribute to increases in vitamin C of vegetables are released to vegetables at a temperature of 40° C., which is an example of the temperature condition that allows the vitamin C of vegetables to be increased. As a result of this, it becomes possible to eat vegetables containing larger amounts of vitamin C. Also, vegetable cooking under the above-described conditions involves no load on the vegetable so that the processed vegetable can be eaten as salad as it is.

Also according to the steam cooker of this embodiment, the steam cooker includes the control unit 100 for performing such temperature control that allows vitamin C to be increased by a heating means composed of the upper heaters 14 and the lower heater 17 or the like, and also for driving the ion generator 38. Thus, it is possible to increase the vitamin C quantity of the food.

Also according to the steam cooker of this embodiment, driving of the steam generator 20 is suppressed when the menu of vegetable cooking is selected. Thus, it is possible to efficiently increase the vitamin C quantity of vegetables.

In addition, in this embodiment, PCI ions were released to spinach or corn marigold for 5 minutes at 40° C. in a no-air flowing state and with no steam present, by which vitamin C of those vegetables were increased.

Alternatively, in this invention, ions having OH radicals or $O_2^-$ ions may be released instead of PCI ions or in addition to PCI ions.

Also in this invention, ions need only to be released at temperatures of 25 to 45° C., and preferably released at 30° C. to 45° C. and, particularly preferably in terms of efficient increases in vitamin C, at 37° C. to 43° C. Besides, ions do not need to be released in a no-air flowing state. For example, with an air stream circulated in the cooker, ions may be mixed with the air stream so as to be sprinkled to vegetables.

Whereas the processing is performed for 5 minutes in this invention, the processing may also be performed for other time durations, e.g., any time duration within a range of 3 to 7 minutes. In this invention, in the state that the steam generator is driven with steam led to the heating cabinet, the processing may be performed with steam present so that vegetables are given moisture.

Also in this invention, heaters may be provided anywhere in any quantity. Further, ions do not necessarily need to be released downward from the ceiling side, and for example, ions may be released sideward into the heating cabinet or released forward from a rear-side face of the heating cabinet in the depthwise direction of the heating cooker.

Whereas vegetable processing in this invention involves no load on the vegetable so that the processed vegetable can be eaten as salad as it is, this processing may also be performed as a pre-processing of cooking, and for example, a vegetable subjected to this pre-processing may be further subjected to a main cooking such as stewing using steam cooking.

In other words, in the heating cooker, when the salad menu is selected, the processing of this invention may be performed automatically. Otherwise, in the heating cooker, when the vegetable cooking is selected, the vegetable processing (cooking) may be performed automatically as pre-processing of vegetable. Then, heat treatment according to a menu of vegetable cooking such as stewing may be performed subsequently. This is because even when this processing is performed before a main processing, decreases in vitamin C quantity can be suppressed to a minimum and moreover heated vegetables containing a larger amount of nutrient (vitamin C) can be eaten.

Normally, raw vegetables cannot be increased in nutrient (vitamin C) from the raw state even by storage in a refrigerator or the like, but this processing allows vitamin C quantity to be increased. Therefore, this vegetable cooking method can preferably be used for utilities other than heating cookers such as vegetable nourishing storehouses.

Further, in the above embodiment, this processing is performed on spinach and corn marigold as examples of foods. However, the processing may be performed on foods other than those, for example, such other vegetables as lettuce and cabbage. This is because many foods show identical or similar properties on enzymes that create vitamin C.

Whereas the heating cooker is a steam cooker in this embodiment, the heating cooker of this invention may be a microwave oven. The heating cooker of this invention may also be a grille or the like. In short, the heating cooker of this invention may also be any device only if the device includes a heating cabinet, a heating means and an ion generator so as to serve for heating and cooking of foods.

REFERENCE SIGNS LIST

1 casing
2 heating cabinet
7 button group
20 steam generator
38 ion generator
51 interior temperature sensor
100 control unit
102 timer

The invention claimed is:

1. A heating cooker comprising:
   a heating cabinet;
   heating means for heating a food in the heating cabinet;
   selection means for selecting a cooking menu of a food in which the food is cooked at a temperature that allows vitamin C of the food to be increased;
   ion species releasing means for releasing ion species that allow vitamin C to be increased in the food set in the heating cabinet; and
   control means for controlling an inside temperature of the heating cabinet to the vitamin C-increasing temperature by the heating means, and also for driving the ion species releasing means, in a case when the selection means selects the cooking menu,
   wherein the heating means includes,
      steam heating means for heating with steam; and
      non-steam heating means for heating without steam, and
   wherein the control means drives the non-steam heating means to increase the temperature of the heating cabinet to the vitamin C-increasing temperature and the ion species releasing means without driving the steam heating means, and
   wherein the heating cabinet includes a top plate, and the ion species releasing means is disposed at a center of the top plate.

2. The heating cooker as claimed in claim 1, wherein the ion species releasing means releases the ion species in a downward direction into the heating chamber.

* * * * *